United States Patent [19]
Ishii et al.

[11] Patent Number: 5,457,572
[45] Date of Patent: Oct. 10, 1995

[54] REAR-PROJECTION SCREEN

[75] Inventors: Masaki Ishii; Ichiro Matsuzaki; Hidehiro Tango, all of Niigata, Japan

[73] Assignee: Kuraray Co., Ltd., Kurashiki, Japan

[21] Appl. No.: 168,161

[22] Filed: Dec. 17, 1993

[30] Foreign Application Priority Data

Dec. 17, 1992 [JP] Japan ................................ 4-355593

[51] Int. Cl.$^6$ .................................................. G03B 21/60
[52] U.S. Cl. ........................... 359/457; 359/452; 359/460
[58] Field of Search ................................. 359/452, 453, 359/455, 456, 457, 460; 425/381.2, 404, 406

[56] References Cited

U.S. PATENT DOCUMENTS

| | | | |
|---|---|---|---|
| Re. 33,795 | 1/1992 | Ogino | 353/74 |
| 4,730,897 | 3/1988 | McKechnie et al. | 350/128 |
| 4,773,731 | 9/1988 | Goldenberg et al. | 350/128 |
| 5,196,960 | 3/1993 | Matsuzaki et al. | 359/453 |
| 5,296,922 | 3/1994 | Mitani et al. | 348/779 |
| 5,400,114 | 3/1995 | Yoshida et al. | 359/457 |

*Primary Examiner*—Richard A. Wintercorn
*Attorney, Agent, or Firm*—Oblon, Spivak, McClelland, Maier & Neustadt

[57] ABSTRACT

In a rear-projection screen comprising a Fresnel lens and a light-diffusing member containing light-diffusing fine particles, it is intended to decrease the moiré and to give no dark feeling at the border even when projection systems are set in a short projection distance. For this end, in the rear-projection screen of the present invention, the thickness of the light-diffusing member is made larger at the border than at the center of the rear-projection screen, or the concentration of the light-diffusing fine particles contained in the light-diffusing member is made larger at the border than at the center so that the rear-projection screen can have light diffusion properties greater at its border than at its center. Here, any of a flat plate, a flat sheet and a lenticular lens sheet can be used as the light-diffusing member.

11 Claims, 6 Drawing Sheets

REAR-PROJECTION SCREEN

BACKGROUND OF THE INVENTION

1. Field of the Invention

This invention relates to a rear-projection screen comprised of a Fresnel lens and a light-diffusing member such as a lenticular lens sheet.

2. Description of the Related Art

As methods for displaying large-screen pictures, a method is known in which an optical image is enlarged and projected onto a rear-projection screen from a CRT (cathode-ray tube), a liquid crystal panel or the like through a projection lens.

Figure 5:
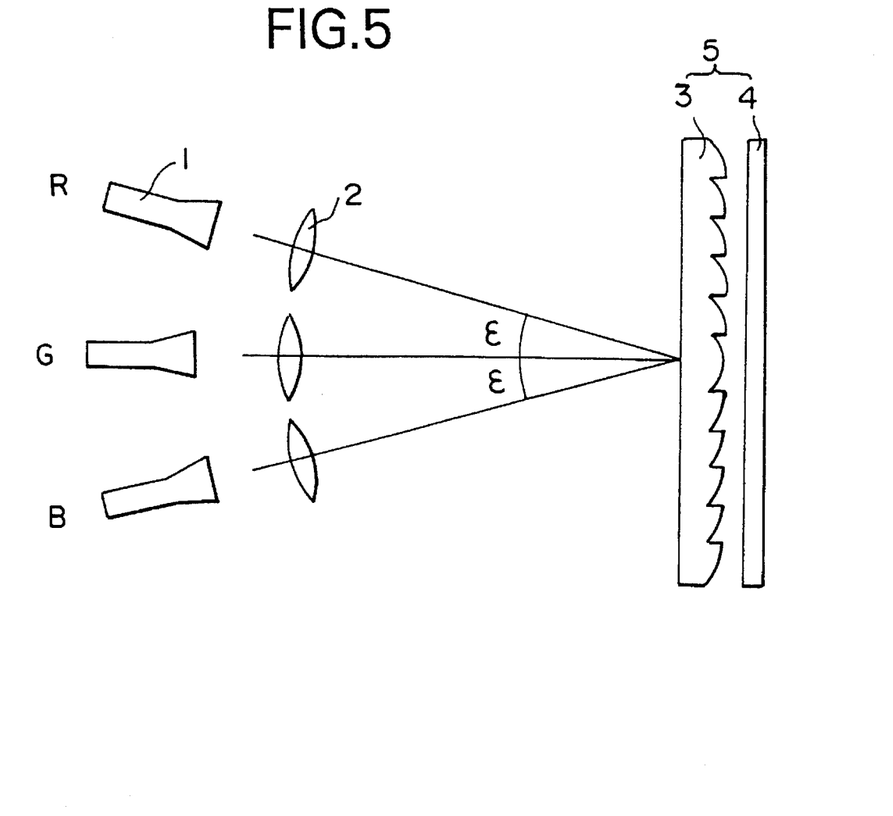
FIG. 5 is a schematic view to illustrate the constitution of a conventional projection device making use of a rear-projection screen.

FIG. 5 shows an example of the constitution commonly employed in display devices capable of forming pictures by such a method. In the display device shown in FIG. 5, optical images sent from CRTS 1 respectively corresponding R (red), G (green) and B (blue) are enlarged through projection lenses 2 and formed as an image onto the surface of a two-sheet type rear-projection screen comprised of a Fresnel lens 3 and a lenticular lens sheet 4. Here, the Fresnel lens 3 has a function of directing the incident light substantially toward the position of a viewer and the lenticular lens sheet 4 has a function of dispersing the light emerging from the Fresnel lens 3, at given angles in the horizontal and vertical directions and in a suitable proportion of distribution to expand a visual angle to the angle of a given scope. As another rear-projection screen known in the art, the lenticular lens sheet 4 in the rear-projection screen 5 shown in FIG. 5 may be replaced with a light-diffusing member comprising a flat plate or flat sheet in which light-diffusing fine particles have been dispersed.

In such display devices, however, the occurrence of color shift and a lowering of white uniformity come into question, the former being a change in color tones of images on a screen that may occur when the position at which the screen is viewed is changed in the horizontal direction and the latter being a difference in color tones at some positions on the screen being viewed, caused by the convergent angles ∈ of the light rays projected from the respective R, G and B CRTs 1.

Figure 4:
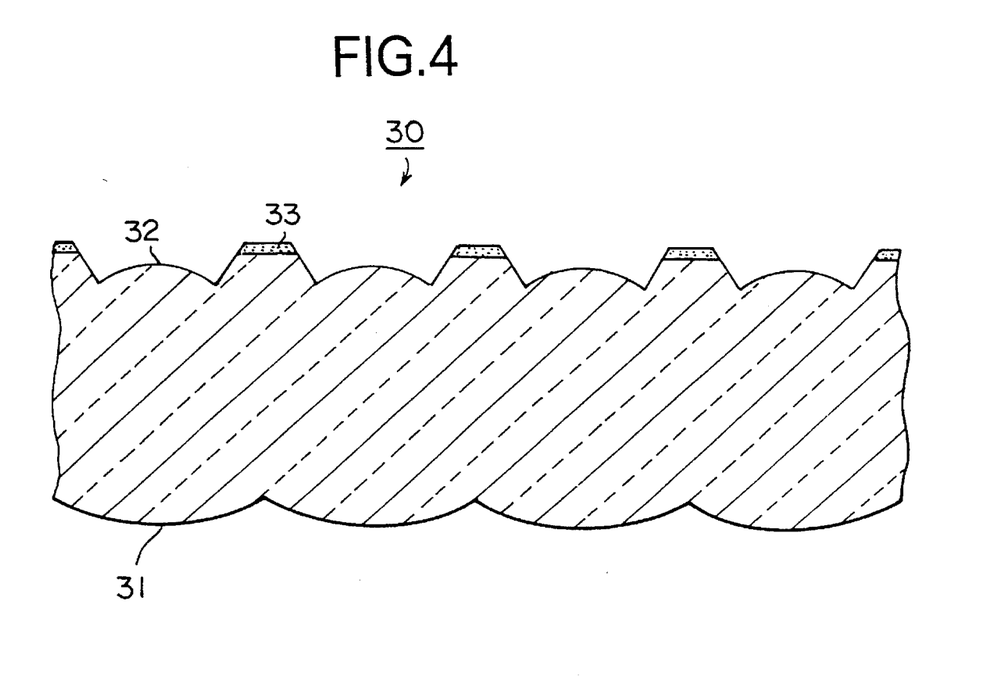
FIG. 4 is a widthwise (horizontal) cross section of another conventional lenticular lens sheet.

Now, in order to decrease the color shift and raise the level of the white uniformity, it is hitherto known to use, as shown in FIG. 4, a double-sided lenticular lens sheet 30 comprised of an entrance lens 31 comprising a cylindrical lens formed on the entrance surface, an exit lens 32 comprising a cylindrical lens also formed on the exit surface, and a light absorbing layer 33 (what is called a black stripe) formed at the light non-convergent part of the exit surface. In such a double-sided lenticular lens sheet 30, various attempts to improve the shape or optical axis shift of each lens element constituting the entrance lens 31 or exit lens 32 have been proposed in order to decrease the color shift while ensuring a wide visual field angle and to raise the level of the white uniformity. Besides the attempt to specify the shape and so forth of each lens element, it is also attempted to uniformly disperse light light-diffusing fine particles throughout the lenticular lens sheet so that the horizontal visual field angle can be ensured chiefly by its lenticular lens and the vertical visual field angle can be ensured by the light diffusion properties of the fine particles. Since the resolution may become lower because of light scattering caused by the fine particles when such light-diffusing fine particles are used to ensure the vertical visual field angle, it is also proposed to form minute concaves and convexes on the surface of the exit lens by various methods.

With such constitution, however, it has been difficult to well improve the properties of the screen if elementary lenses of the lenticular lens sheet are arranged in a small pitch in order to obtain images with a high resolution. Namely, if elementary lenses of the lenticular lens sheet are arranged in a small pitch in order to obtain images with a high resolution, the horizontal visual field angle becomes small when the thickness of lenses is unchanged. Hence, it becomes necessary to make the thickness of lenses smaller in order to ensure the desired horizontal visual field angle. For example, if it is intended in a conventional lenticular lens sheet to obtain a horizontal half visual field angle of 37° in a lens pitch of 0.6 mm, it becomes necessary to form the lenticular lens sheet in a thickness of as small as 0.78 mm. It, however, is difficult in itself to produce lenticular lens sheets with a thickness of as small as 0.78 mm, by extrusion which is a process presently available for efficient mass production of lenticular lens sheets, and there is a problem that the resulting products tend to break. Lenticular lens sheets can be stably produced by extrusion if they are formed in a thickness of 0.9 mm or more. Such a thickness, however, can not be enough to achieve the horizontal half visual field angle of 37°. Meanwhile, if a lenticular lens sheet is made to have a thickness large enough to be stably produced and the light-diffusing fine particles are used to ensure the horizontal visual field angle, the color shift can be better prevented, but the light diffusion inside the lenticular lens sheet may increase to cause an increase in the amount of the light entering into its light absorbing layer, so that another problem of a decrease in the amount of emergent light may occur.

Figure 3:
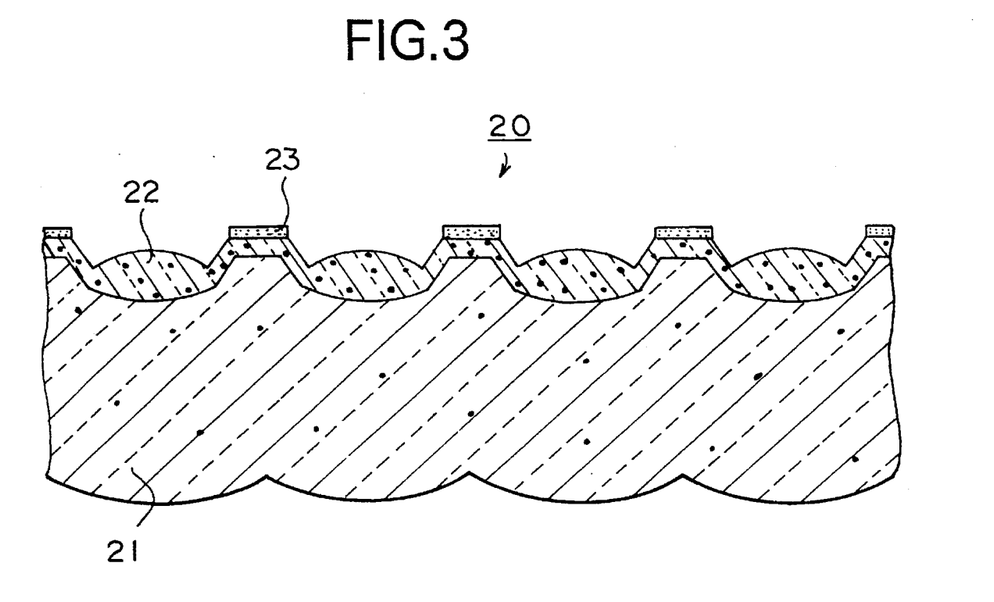
FIG. 3 is a widthwise (horizontal) cross section of a conventional lenticular lens sheet.

Accordingly, the present inventors have proposed, as shown in FIG. 3, a lenticular lens sheet comprising a double-sided lenticular lens having a light absorbing layer 23 on its exit side, wherein the double-sided lenticular lens is formed of a double-layered lens comprised of an entrance lens layer 21 and an exit lens layer 22, the light-diffusing fine particles are dispersed in the exit lens layer 22, and also the exit lens layer 22 is formed in a thickness smaller than the entrance lens layer 21 (Japanese Patent Application Laid-open No. 5-61120). In such a double-layered lenticular lens sheet 20, the light-diffusing fine particles are dispersed in a high concentration in the thin exit lens layer 22, and hence the light can be made to well diffuse in the exit lens layer to thereby expand the visual field angle. Moreover, the diffused light can be prevented from entering into the light absorbing layer 23. Thus, it becomes possible to increase the utilization of light, make pictures bright, and make the visual field angle larger and the lens pitch smaller to enhance the resolution. In addition, since the light diffusion elements are concentrated on the exit surface of the lenticular lens, it becomes possible to decrease the moiré caused by the overlap of a dark line ascribable to a rise face of the Fresnel lens (the face connecting a land and a valley of the lens face) with the light absorbing layer of the lenticular lens.

Even in the lenticular lens sheet disclosed in the above Japanese Patent Application Laid-open No. 5-61120, however, when it is intended to obtain much brighter pictures, the light diffusion properties of the lenticular lens sheet must be made smaller than usual by decreasing the amount of the light-diffusing fine particles or making smaller the thickness of the exit lens layer in which the light-diffusing fine particles have been dispersed. In such a case, the dark line ascribable to the rise face of the Fresnel lens can not be made substantially thin by well diffusing the light in the exit lens layer and hence the moiré can not be well decreased. Such a problem has remained unsettled.

Figure 11:
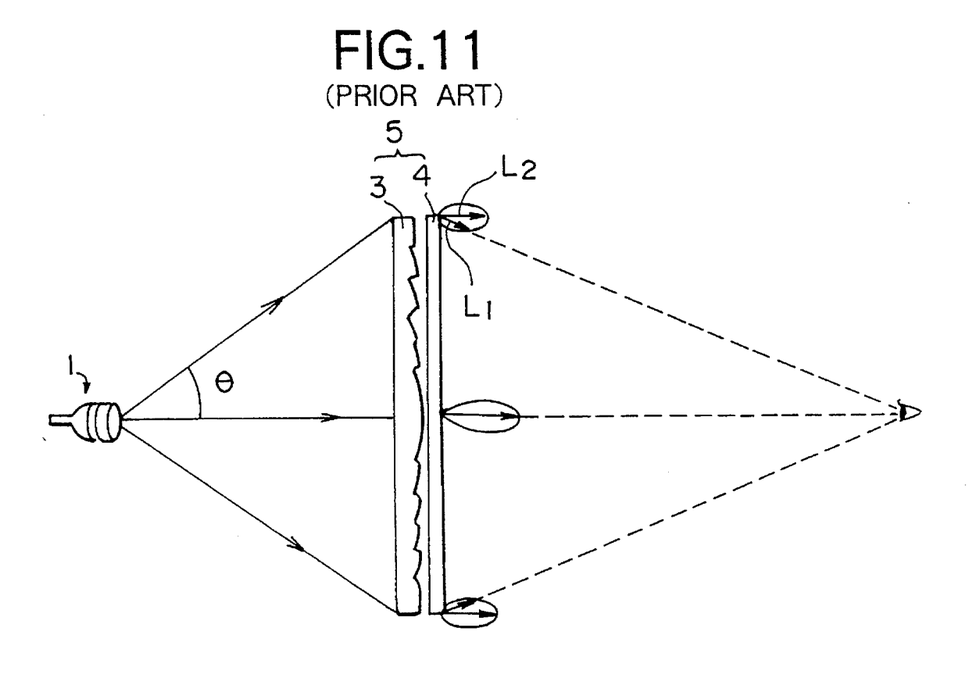
FIG. 11 illustrates the relationship between the field angle and the intensity of the light emerging from a screen, with regard to a conventional rear-projection screen.

In recent years, there is a demand for making projection devices as compact as possible. As the projection distance is made shorter according to such a demand, the field angle (or angle of view) 2θ as shown in FIG. 11 becomes larger, which is the angle formed by light rays shed from a light source 1 of a CRT or the like toward the edges of a rear-projection screen 5. Then, in general, the intensity of the light made incident on the edge portions of the rear-projection screen 5 becomes weak in proportion to $\cos^4\theta$. Light loss due to reflection on the Fresnel lens 3 also increases as the field angle becomes larger. Hence, Iris common for the intensity of the light emerging from the Fresnel lens 3 to become smaller at the border (herein meant to be the boundary of a surface, including its inside area with a certain breadth) of the screen as the projection distance is made shorter. For this reason, the light emerging from the border of the lenticular lens sheet 4 toward a viewer also becomes weak to bring about the problem that the border of the screen, in particular, the four corners thereof give a dark feeling. More specifically, the state of diffusion of the light emerging from the center and border of the lenticular lens sheet 4 can be expressed as shown in FIG. 11. As shown in the drawing, when an intensity of the light emerging in the direction where the diffused light intensity is greatest at the border of the screen is represented by $L_2$ and an intensity of the light emerging toward the position at which the viewer usually views the screen (the position 3 to 5 m distant from the center of the lenticular lens sheet 4) is represented by $L_1$, the $L_1$ becomes weak as the projection distance is made shorter. The problem that the screen, in particular, the four corners thereof give a dark feeling when the projection distance is shortened is similarly seen also in the case when the lenticular lens sheet disclosed in the above Japanese Patent Application Laid-open No. 5-51120 is used.

As the rear-projection screen used when a bright picture is formed on a large screen in a high resolution, those making use of the double-layered lenticular lens sheet as described above are preferred. Besides these, when a relatively small-screen picture is formed, a rear-projection screen comprised of a combination of a flat plate or flat sheet in which light-diffusing fine particles have been dispersed with a Fresnel lens and a rear-projection screen comprised of a combination of a single-layer lenticular lens sheet with a Fresnel lens are still put into use at present, without use of the double-layered lenticular lens sheet. Like the rear-projection screen making use of the double-layered lenticular lens sheet described above, these rear-projection screens also have the problem that the border of the screen, in particular, the four corners thereof give a dark feeling when the projection distance is made shorter according to the recent demand for making projection devices as compact as possible. In the rear-projection screen making use of the single-layer lenticular lens having a light absorbing layer on its exit lens layer, there is also the problem that the moiré becomes conspicuous at the border of the screen.

SUMMARY OF THE INVENTION

The present invention intends to solve the problems involved in the prior art as discussed above. An object of the present invention is to more decrease the moiré than ever and to make the border of a screen free from a darkness even in a projection system having a short projection distance.

To achieve the above object, the present invention provides a rear-projection screen comprising a Fresnel lens and a light-diffusing member containing light-diffusing fine particles, wherein said light-diffusing member has light diffusion properties greater at its border than at its center.

In particular, the present invention provides the rear-projection screen, wherein the light-diffusing member comprises a double-layered lenticular lens sheet comprised of an entrance lens layer having a plurality of entrance lenses and an exit lens layer having a plurality of exit lenses whose lens surfaces are each formed at the light convergent point pertaining to the entrance lens, or in the vicinity thereof, and a light absorbing layer formed on the exit lens layer at its light non-convergent part pertaining to the entrance lens layer.

As a process for producing the multi-layered lenticular lens sheet constituting such a rear-projection screen, the present invention also provides a process for producing a lenticular lens sheet, comprising the steps of co-extruding a first resin that forms an entrance lens layer and a second resin that forms an exit lens layer and passing the co-extruded resins between rolls having given concaves and convexes to carry out molding, wherein said second resin that forms the exit lens layer is fed so as to be in a quantity larger at the border of said lenticular lens sheet than at the center thereof.

DETAILED DESCRIPTION OF THE INVENTION

Figure 10:
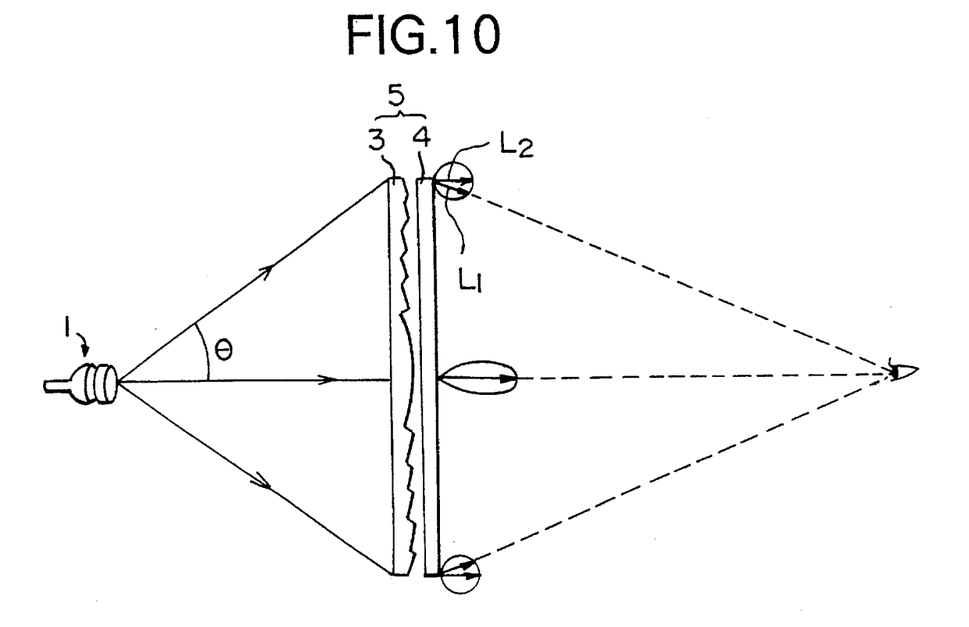
FIG. 10 illustrates the relationship between the field angle and the intensity of the light emerging from a screen, with regard to the rear-projection screen of the present invention.

The rear-projection screen of the present invention comprises a Fresnel lens and a light-diffusing member containing light-diffusing fine particles, characterized in that the light-diffusing member has light diffusion properties greater at its border than at its center. Since the light diffusion properties of the light-diffusing member are made greater at its border, it becomes possible to strengthen the light diffusion properties at the border without changing the brightness at the center, and thereby to make faint the dark lines caused by the Fresnel lens to weaken the moiré. In addition, as shown in FIG. 10, because of an increase in the amount of the light diffusing at the border, the proportion of light $L_1$ to light $L_2$ in the light emerging from the border becomes larger; the former being the light going toward a viewer positioned in front of the rear-projection screen at its center and the latter being the light emerging in the direction perpendicular to the screen surface. Hence, the viewer positioned in front of the rear-projection screen at its center can view a bright picture also at the border of the screen.

In the present invention, the light-diffusing member capable of making light diffusion properties greater at the border may comprise a flat plate, a flat sheet or a lenticular lens sheet, any of which can be used so long as it contains light-diffusing fine particles. The lenticular lens sheet may be the single-layer lens sheet as shown in FIG. 4, comprised of an entrance lens 31 and an exit lens 32 which are formed in the same resin layer, or the double-layered lens sheet as shown in FIG. 3, comprised of an entrance lens layer having an entrance lens 21 and an exit lens layer having an exit lens 22 whose lens surface is formed at the light convergent point pertaining to the entrance lens, or in the vicinity thereof. Any of them can be used. In the rear-projection screen of the present invention, as the light-diffusing member, any of the flat plate, the flat sheet and the lenticular lens sheet may be appropriately selected according to the purpose for which the rear-projection screen is used.

For example, when a bright image with a high resolution is formed on a large screen, it is preferable to use the double-layered lenticular lens sheet as shown in FIG. 3. In particular, such a double-layered lenticular lens sheet may preferably be a lenticular lens sheet in which as disclosed in Japanese Patent Application Laid-open No. 5-61120 the entrance lens layer and the exit lens layer are each formed of a substantially transparent thermoplastic resin, and at least the exit lens layer contains the light-diffusing fine particles so that the lenticular lens sheet has parameters satisfying the following expressions (I) and (II);

$$t_1 > t_2 > 0 \tag{I}$$

$$0 \leq \frac{\Delta n_1 c_1}{\rho_1 d_1} < \frac{\Delta n_2 c_2}{\rho_2 d_2} \tag{II}$$

wherein $t_1$ represents a thickness of the entrance lens layer; $t_2$, a thickness of the exit lens layer; $\Delta n_1$, a difference in refractive index between the thermoplastic resin and the light-diffusing fine particles in the entrance lens layer; $\Delta n_2$, a difference in refractive index between the thermoplastic resin and the light-diffusing fine particles in the exit lens layer; $c_1$, a weight concentration of the light-diffusing fine particles in the entrance lens layer; $c_2$, a weight concentration of the light-diffusing fine particles in the exit lens layer; $\rho_1$, a density of the light-diffusing fine particles in the entrance lens layer; $\rho_2$, a density of the light-diffusing fine particles in the exit lens layer; $d_1$, an average particle diameter of the light-diffusing fine particles in the entrance lens layer; and $d_2$, an average particle diameter of the light-diffusing fine particles in the exit lens layer; to thereby making the light diffusion properties stronger in the exit lens layer than in the entrance lens layer. For this end, for example, the exit lens layer may be made to contain the light-diffusing fine particles in a higher concentration than the entrance lens layer.

In any instances in which the flat plate, the flat sheet or the lenticular lens sheet is used as the light-diffusing member, its light diffusion properties can be made greater at the border than at the center by, for example, a method in which the refractive index of the light-diffusing fine particles incorporated into the light-diffusing member is made greater at the border than at the center, the thickness of the light-diffusing member is made larger at the border than at the center, or the distribution of the light-diffusing fine particles in the light-diffusing member is made higher in concentration at the border than at the center. In particular, when the double-layered lenticular lens sheet is used as the light-diffusing member, the thickness of the exit lens layer may be made larger at the border than at the center or the distribution of the light-diffusing fine particles in the exit lens layer may be made higher in concentration at the border than at the center, either of which is preferable.

As a preferred embodiment of the light-diffusing member used in the rear-projection screen of the present invention, a double-layered lenticular lens sheet in which the thickness of the exit lens layer is made larger at the border than at the center will be described below with reference to the drawings.

Figure 1:
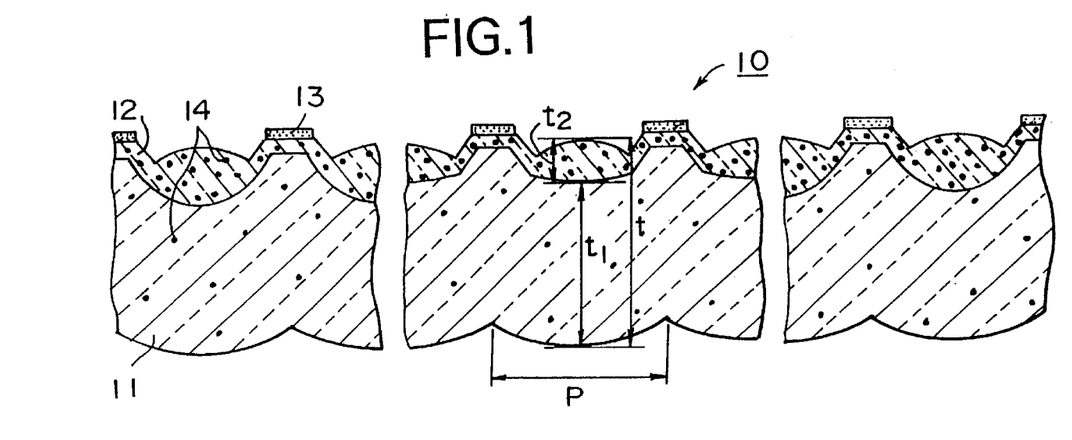
FIG. 1 is a widthwise (horizontal) cross section of a lenticular lens sheet suitable for the rear-projection screen of the present invention.

FIG. 1 is a widthwise (horizontal) cross section of such a double-layered lenticular lens sheet. As shown in the drawing, this lenticular lens sheet, denoted by reference numeral 10, has an entrance lens layer 11 on the light-incident side, and has an exit lens layer 12 on the light-emergent side. In the entrance lens layer 11, a plurality of cylindrical lenses are formed. In the exit lens layer 12, a plurality of cylindrical lenses are formed whose lens surfaces are each formed at the light convergent point of each cylindrical lens of the entrance lens layer 11, or in the vicinity thereof. This exit lens layer 12 is formed in a thickness $t_2$ smaller than the thickness $t_1$ of the entrance lens layer 11.

Such entrance lens layer 11 and exit lens layer 12 are each formed of a substantially transparent thermoplastic resin. In this case, the thermoplastic resins used in these layers may also be those having refractive indexes different from each other.

In the entrance lens layer 12 at least, light-diffusing fine particles 14 are contained. In the entrance lens layer 11, the light-diffusing fine particles are optionally contained. In this case, the light-diffusing fine particles 14 in each layer may be comprised of one kind of fine particles, or may also be comprised of two or more kinds of fine particles. The fine particles may preferably be contained so that as disclosed in Japanese Patent Application Laid-open No. 5-61120 the exit lens layer 12 and the entrance lens layer 11 have parameters satisfying the following expressions (I) and $$t_1 > t_2 > 0 \tag{I}$$

$$0 \leq \frac{\Delta n_1 c_1}{\rho_1 d_1} < \frac{\Delta n_2 c_2}{\rho_2 d_2} \tag{II}$$

wherein $t_1$ represents a thickness of the entrance lens layer; $t_2$, a thickness of the exit lens layer; $\Delta n_1$, a difference in refractive index between the thermoplastic resin and the light-diffusing fine particles in the entrance lens layer; $\Delta n_2$, a difference in refractive index between the thermoplastic resin and the light-diffusing fine particles in the exit lens layer; $c_1$, a weight concentration of the light-diffusing fine particles in the entrance lens layer; $c_2$, a weight concentration of the light-diffusing fine particles in the exit lens layer; $\rho_1$, a density of the light-diffusing fine particles in the entrance lens layer; $\rho_2$, a density of the light-diffusing fine particles in the exit lens layer; $d_1$, an average particle diameter of the light-diffusing fine particles in the entrance lens layer; and $d_2$, an average particle diameter of the light-diffusing fine particles in the exit lens layer; to thereby making the light diffusion properties stronger in the exit lens layer 12 than in the entrance lens layer 11. For this end, for example, the exit lens layer 12 may be made to contain the light-diffusing fine particles in a higher concentration than the entrance lens layer 11.

Figure 2:
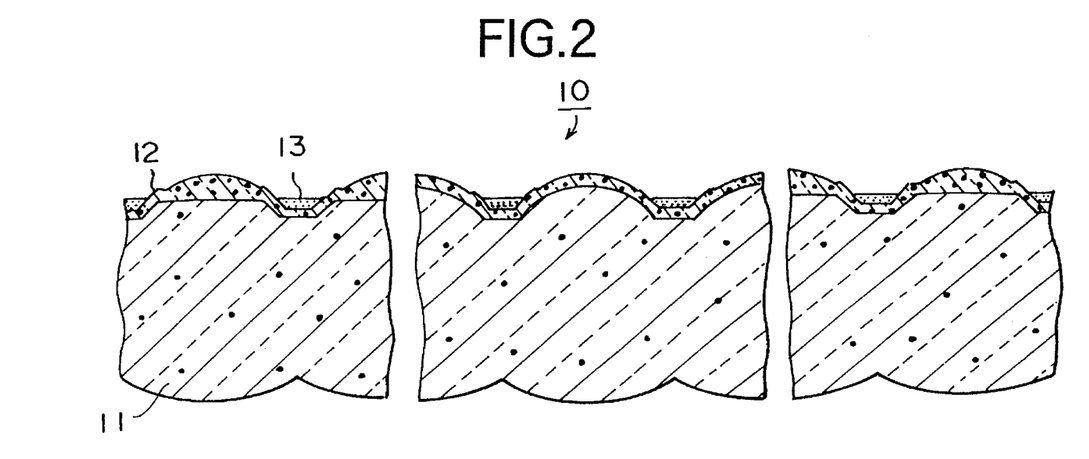
FIG. 2 is a widthwise (horizontal) cross section of another embodiment of the lenticular lens sheet suitable for the rear-projection screen of the present invention.

A light absorbing layer 13 is formed on the exit lens layer 12 at its light non-convergent part pertaining to the entrance lens. FIG. 1 shows an example in which the light absorbing layer 13 is formed at the land of the exit lens layer 12. Alternatively, according to the pitch of lenses, the light absorbing layer 13 may be formed at the valley of the exit lens layer 12 as shown in FIG. More specifically, in the case when the light absorbing layer 13 is fromed at the land of the exit lens layer 12 as shown in FIG. 1, the land must be formed in such a height that the side walls of the land do not shut out the emergent light. If the lenses have a relatively large pitch, it is easy to form it in such a way and is preferred. Meanwhile, if the lenses have a minute pitch, it becomes difficult to do so in view of the production process since the difference in height between the land and the exit lens must be made smaller in proportion to the pitch. On the other hand, in the case when the light absorbing layer 13 is formed at the valley of the exit lens layer 12 as shown in FIG. 2, the production process may usually become complicated compared with the case when the light absorbing layer is formed on the land, but the emergent light is by no means shut out even when the lenses have a minute pitch, bringing about an increase in the utilization of light. Hence, when the lenses have a minute pitch, it is preferred to form the light absorbing layer 13 at the valley of the exit lens layer 12.

These lenticular lens sheets of the embodiments shown in FIGS. 1 and 2 are characterized by having a thickness distribution that the thickness $t_2$ of the exit lens layer 12 is larger at the border than at the center of the lenticular lens sheet.

Figure 6:
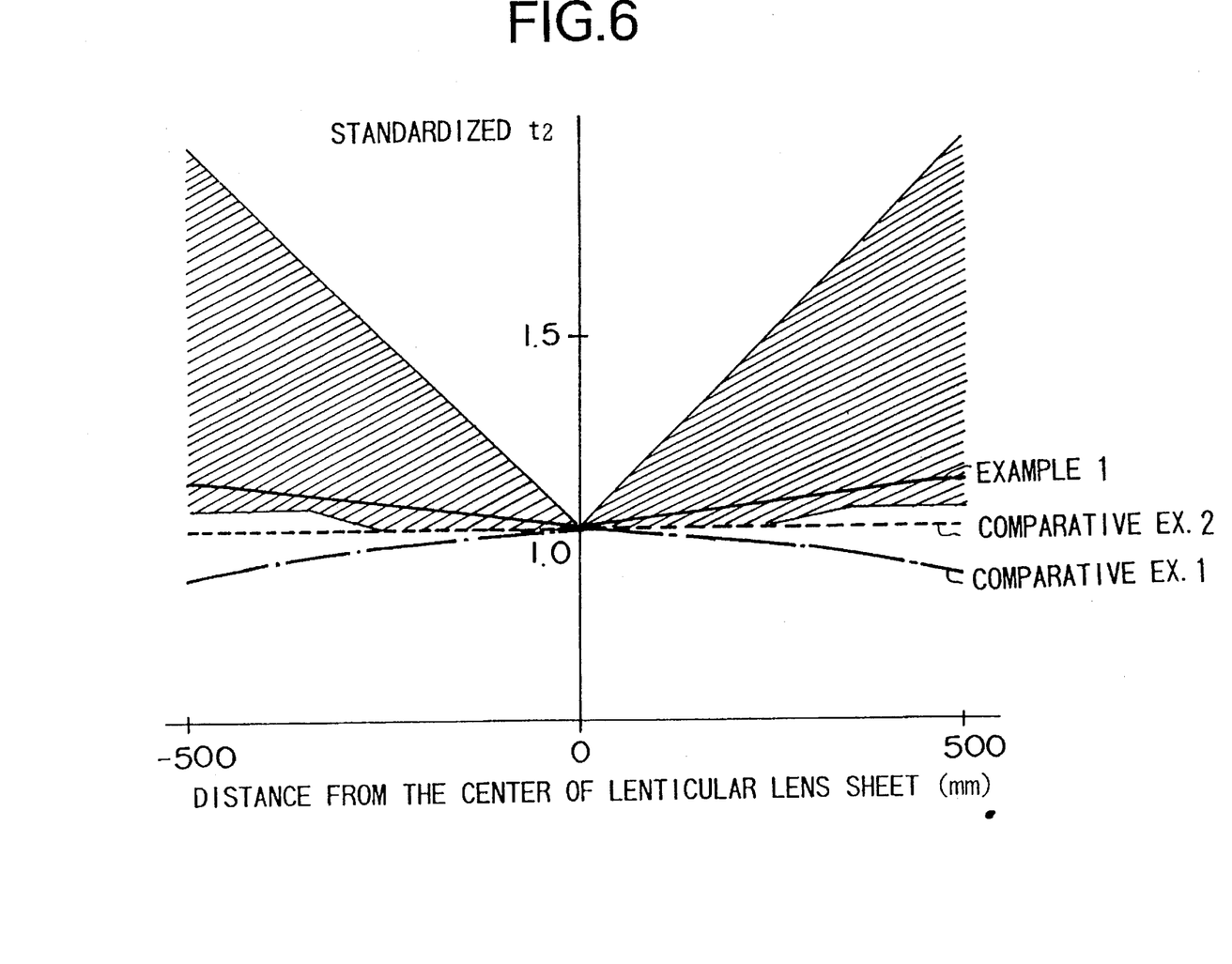
FIG. 6 illustrates the thickness distribution of an exit lens of a lenticular lens sheet.

FIG. 6 illustrates a preferable thickness distribution to be imparted to the exit lens layer 12 of the double-layered lenticular lens sheet, in respect of the relationship between the widthwise positions of the lenticular lens sheet (the distance (mm) from the center of a lenticular lens sheet of 1,000 mm wide) and the thickness thereof (the thickness of the exit lens layer 12 at every position when the thickness of the exit lens layer 12 at the center of the lenticular lens sheet is standardized as 1.0). The portion shaded in the drawing corresponds to a preferred range.

When the thickness distribution is imparted to the exit lens layer 12 of the double-layered lenticular lens sheet, the positional range in which the thickness of the exit lens layer 12 is made larger can be appropriately determined according to, for example, the screen gain at the center. In usual instances, as shaded in the drawing, it may be set widthwise outward by 250 mm or more from the center of the lenticular lens sheet. The thickness $t_2$ of the exit lens layer positioned at the outward portion thus defined may preferably be not less than 1.05 times the thickness $t_2$ of the exit lens layer at the center, where the proportion of changes in thickness may preferably be not more than 5 µm/10 mm. This makes it possible to decrease the moiré without causing a lowering of resolution or a decrease in luminance. In order to decrease the moiré, the larger the thickness $t_2$ of the exit lens layer is, the more preferable it is. However, an excessively large thickness is not preferable since it may bring about an increase in the amount of the light incident on the light absorbing layer 13 after it has been diffused by the light-diffusing fine particles 14 in the exit lens layer 12, resulting in a decrease in luminance of the screen. An excessively large proportion of changes in the thickness of the exit lens layer 12 is also not preferable since it may bring about a feeling of non-uniform brightness.

Stated more specifically, when, for example, the lenticular lens sheet has a width of 1,000 mm and its exit lens layer at the center has a thickness of 170 µm, the exit lens layer may preferably have a thickness of from 170 to 200 µm at its position about 300 mm outward from the center of the lenticular lens sheet and from 180 to 230 µm at its position about 450 mm outward from the center.

There are no particular limitations on the method for producing the lenticular lens sheet having the exit lens layer 12 to which the thickness distribution has been imparted. Such a sheet may be produced by a co-extrusion molding process comprising the steps of co-extruding a resin that forms the entrance lens layer 11 and a resin that forms the exit lens layer 12 and passing the co-extruded resins between rolls having given concaves and convexes to carry out molding.

Figure 8:
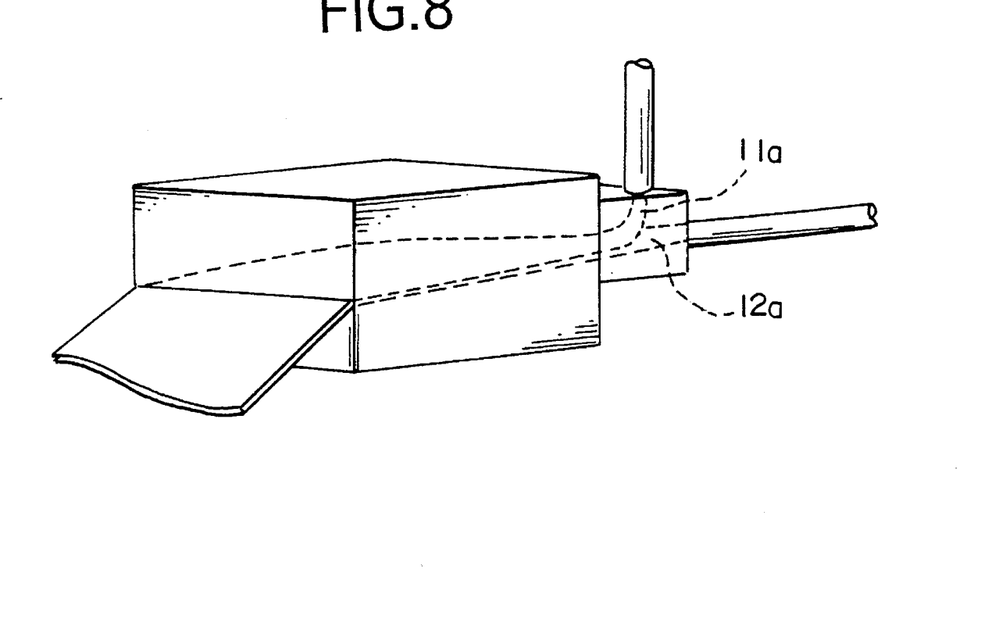
FIG. 8 illustrates an instance in which a lenticular lens sheet is molded by co-extrusion using a feed block die.
Figure 9:
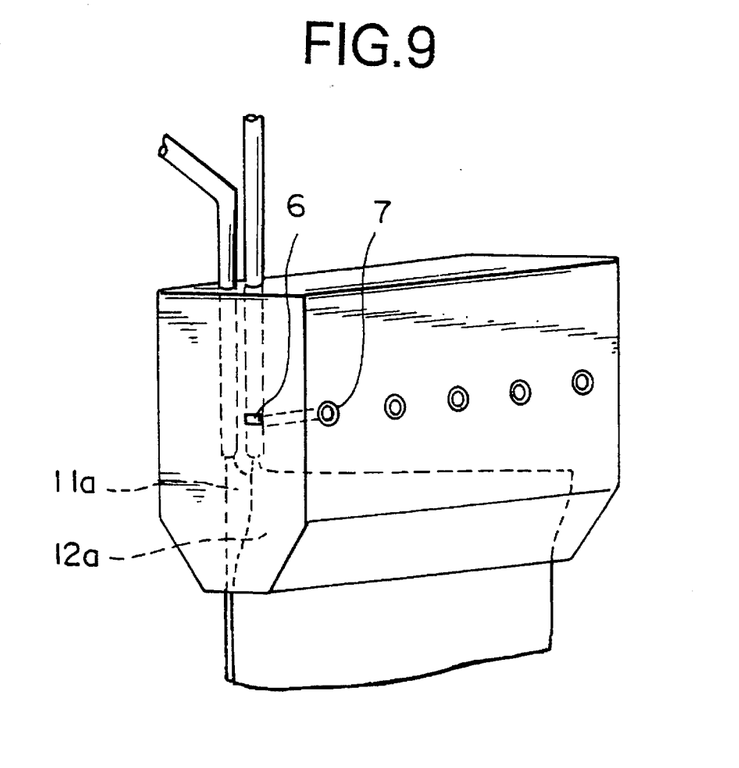
FIG. 9 illustrates an instance in which a lenticular lens sheet is molded by co-extrusion using a multi-manifold die.

As apparatus used to carry out the co-extrusion molding, a feed block die and a multi-manifold die are known in the art; the former being, as shown in FIG. 8, capable of extruding resins 11a and 12a that form the respective layers, while making the resins join before they spread in the width of a die, and the latter being, as shown in FIG. 9, capable of extruding resins 11a and 12a that form the respective layers, while making the resins join after they have each spread in the width of a die. In particular, it is preferred to use the multimanifold die. In the case when the multi-manifold die is used, a preferable thickness distribution can be imparted to the exit lens layer 12 by, for example, a method in which a choke bar for setting the flow rate of the resin that forms the exit lens layer 12 is controlled by a bolt 7 so that the flow rate of the resin becomes gradually larger from the center toward the border.

The light-diffusing member used in the rear-projection screen of the present invention has been described above in detail. As for the Fresnel lens also used in the rear-projection screen of the present invention, there are no particular limitations thereon, and any Fresnel lenses conventionally used in rear-projection screens can be used.

EXAMPLES

Example 1

A lenticular lens sheet with the structure as shown in FIG. 1 was produced by co-extrusion using a multi-manifold dye. In this instance, polymethyl methacrylate was used as the resin for forming the entrance lens layer 11 and polymethyl methacrylate was also used as the resin for forming the exit lens layer 12. In the resin, 15% by weight of inorganic particles whose diameter was 20 µm and refractive index was different by 0.066 from that of the polymethyl methacrylate were incorporated as the light-diffusing fine particles. In the multi-manifold dye, extrusion conditions for the exit lens layer were controlled so as for the extrusion rate to become larger at the border than at the center.

Thus, a lenticular lens sheet was obtained, having a lens pitch (p) of 0.9 mm; a total thickness (t) of 1.07 mm; a thickness ($t_1$) of 0.9 mm at the center of the entrance lens layer 11; and a thickness ($t_2$) distribution of the exit lens layer 12, of 170 µm thick at the center, 200 µm thick at the position 300 mm distant from the center and 215 µm thick at the position 450 mm or more outward from the center, as shown by a solid line in FIG. 6. In this lenticular lens sheet, the entrance lens had a configuration, represented by the expression (III):

$$Z(x) = \frac{Cx^2}{1 + \{1 - (K+1)C^2x^2\}^{1/2}} \quad \text{(III)}$$

wherein C represents a main curvature and K represents a conical constant; of a main curvature C of 2.7 and a conical constant K of −0.45, and the exit lens had a configuration, represented by the expression (III), of a main curvature C of −3.8 and a conical constant K of −3.0.

On the lens sheet thus molded, the light absorbing layer 13 was printed by a conventional process. Thus, a lenticular lens sheet used in the rear-projection screen of the present invention was obtained.

Meanwhile, as a Fresnel lens, a lens having a focal length f of 900 mm was made ready.

Then the above lenticular lens sheet and Fresnel lens were combined to form a rear-projection screen of 1,100 wide and 860 mm high.

A CRT and a projection lens were placed at the back 900 mm distant from the screen, where a white picture was projected onto the screen and viewed. As a result, when the picture was viewed at a distance of 3 m from the center of the screen, no moiré was seen. When the picture as similarly viewed at a distance of 1.5 m, the moiré was slightly seen at the position 400 mm outward from the center of the screen.

Figure 7:
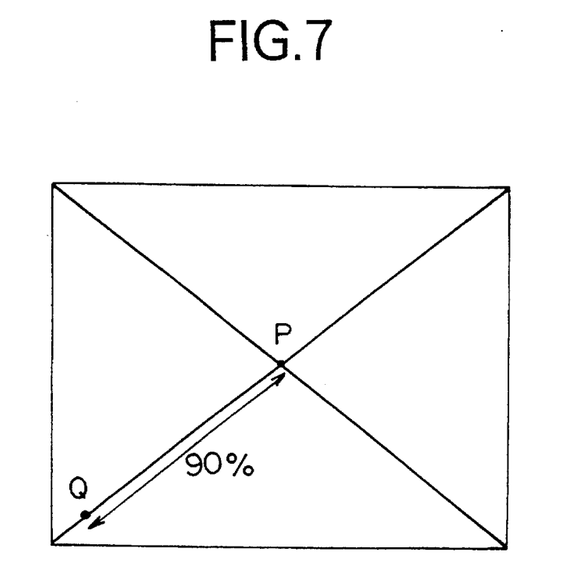
FIG. 7 illustrates the part at which the luminance of a screen is measured.

Luminance on the screen was also measured in respect of, as shown in FIG. 7, a luminance at the position Q diagonally distant by 90% from the center P of the screen and a luminance at the center P of the screen, and the ratio in the both was calculated to find that the luminance at the position Q diagonally distant by 90% was 7% of the luminance at the center P.

Comparative Example 1

A lenticular lens sheet was produced in the same manner as in Example 1 except that in the multi-manifold dye the extrusion conditions for the exit lens layer were controlled so as for the extrusion rate to become smaller at the border than at the center. Thus, a lenticular lens sheet was obtained, having a lens pitch (p) of 0.9 mm; a total thickness (t) of 1.07 mm; a thickness ($t_1$) of 0.8 mm at the center of the entrance lens layer 11; and a thickness ($t_2$) distribution of the exit lens layer 12, of 170 μm thick at the center, 160 μm thick at the position 300 mm distant from the center and 150 μm thick at the position 450 mm or more outward from the center, as shown by a chain line in FIG. 6.

The lenticular lens sheet thus obtained and a Fresnel lens were combined in the same manner as in Example 1 and used as a projection screen, where a white picture was projected onto the screen and viewed. As a result, when the picture was viewed at a distance of 3 m from the center of the screen, the moiré was seen at the position 385 mm outward from the center of the screen. When the picture as similarly viewed at a distance of 1.5 m, the moiré was strongly seen at the position 250 mm outward from the center of the screen.

Comparative Example 2

A lenticular lens sheet was produced in the same manner as in Example 1 except that in the multi-manifold dye the extrusion conditions for the exit lens layer were controlled so as for the extrusion rate to be the same in the whole width direction. Thus, a lenticular lens sheet was obtained, having a lens pitch (p) of 0.9 mm; a total thickness (t) of 1.07 mm; a thickness ($t_1$) of 0.8 mm at the center of the entrance lens layer 11; and a thickness ($t_2$) of the exit lens layer 12, of 170 μm over the whole width as shown by a broken line in FIG. 6.

The lenticular lens sheet thus obtained and a Fresnel lens were combined in the same manner as in Example 1 and used as a projection screen, where a white picture was projected onto the screen and viewed. As a result, when the picture was viewed at a distance of 3 m from the center of the screen, the moiré was seen at the position 400 mm outward from the center of the screen. When the picture as similarly viewed at a distance of 1.5 m, the moiré was strongly seen at the position 350 mm outward from the center of the screen.

At a distance of 1.5 m from the center of the screen, the luminance at the position diagonally distant by 90% from the center of the screen was 5% of the luminance at the center.

Example 2

A light-diffusing plate comprising an incident side layer and an emergent side layer was prepared in the same manner as in Example 1 except that it was molded so as for its incident side surface and emergent side surface to become smooth. The light-diffusing plate thus obtained was 2 mm thick, and its emergent side diffusing layer was 0.5 mm thick at the center of the screen and 0.8 mm thick at the position 450 mm or more outward from the center.

The light-diffusing plate thus obtained and a Fresnel lens were combined in the same manner as in Example 1 and used as a projection screen, where a white picture was projected onto the screen and the brightness of the picture was observed.

As a result, the luminance at the position diagonally distant by 90% from the center of the screen was 8% of the luminance at the center.

Comparative Example 3

A light-diffusing plate was prepared in the same manner as in Example 2 except that in the multi-manifold dye the extrusion conditions for the emergent side layer were controlled so as for the extrusion rate to be the same in the whole width direction. The emergent side diffusing layer of the light-diffusing plate thus obtained was 0.5 mm thick over the whole width.

The light-diffusing plate thus obtained and a Fresnel lens were combined in the same manner as in Example 1 and used as a projection screen, where a white picture was projected onto the screen and the brightness of the picture was observed.

As a result, the luminance at the position diagonally distant by 90% from the center of the screen was 6% of the luminance at the center.

What is claimed is:

1. A rear-projection screen comprising a Fresnel lens and a light-diffusing member containing light-diffusing fine particles, wherein said light-diffusing member has light diffusion properties greater at its border than at its center.

2. The rear-projection screen according to claim 1, wherein said light-diffusing member has a thickness larger at its border than at its center.

3. The rear-projection screen according to claim 1, wherein said light-diffusing member contains the light-diffusing fine particles at a higher concentration at its border than at its center.

4. The rear-projection screen according to any one of claims 1 to 3, wherein said light-diffusing member comprises a flat plate, a flat sheet or a lenticular lens sheet.

5. The rear-projection screen according to claim 1, wherein said light-diffusing member comprises a double-layered lenticular lens sheet comprised of an entrance lens layer having a plurality of entrance lenses and an exit lens layer having a plurality of exit lenses whose lens surfaces are each formed at the light convergent point pertaining to the entrance lens, or in the vicinity thereof, and a light absorbing layer formed on the exit lens layer at its light non-convergent part pertaining to the entrance lens layer.

6. The rear-projection screen according to claim 5, wherein said lenticular lens sheet comprises an entrance lens layer and an exit lens layer each formed of a substantially transparent thermoplastic resin, and at least the exit lens layer contains the light-diffusing fine particles so that the lenticular lens sheet has parameters satisfying the following expressions (I) and (II);

$$t_1 > t_2 > 0 \tag{I}$$

$$0 \leq \frac{\Delta n_1 c_1}{\rho_1 d_1} < \frac{\Delta n_2 c_2}{\rho_2 d_2} \tag{II}$$

wherein $t_1$ represents a thickness of the entrance lens layer; $t_2$, a thickness of the exit lens layer; $\Delta n_1$, a difference in refractive index between the thermoplastic resin and the light-diffusing fine particles in the entrance lens layer; $\Delta n_2$, a difference in refractive index between the thermoplastic resin and the light-diffusing fine particles in the exit lens layer; $c_1$, a weight concentration of the light-diffusing fine particles in the entrance lens layer; $c_2$, a weight concentration of the light-diffusing fine particles in the exit lens layer; $\rho_1$, a density of the light-diffusing fine particles in the entrance lens layer; $\rho_2$, a density of the light-diffusing fine particles in the exit lens layer; $d_1$, an average particle diameter of the light-diffusing fine particles in the entrance lens layer; and $d_2$, an average particle diameter of the light-diffusing fine particles in the exit lens layer.

7. The rear-projection screen according to claim 5 or 6, wherein said exit lens layer has a thickness larger at its border than at its center.

8. The rear-projection screen according to claim 7, wherein the thickness of said exit lens layer at its position widthwise outward by 250 mm or more from the center of the lenticular lens sheet is larger than the thickness at its center.

9. The rear-projection screen according to claim 8, wherein the thickness of said exit lens layer at its position widthwise outward by 250 mm or more from the center of the lenticular lens sheet is not less than 1.05 times the thickness of the exit lens layer at the center.

10. The rear-projection screen according to claim 5 or 6, wherein said exit lens layer contains the light-diffusing fine particles at a higher concentration at its border than at its center.

11. A process for producing a lenticular lens sheet, comprising the steps of co-extruding a first resin that forms an entrance lens layer and a second resin that forms an exit lens layer and passing the co-extruded resins between rolls having given concaves and convexes to carry out molding, wherein said second resin that forms the exit lens layer is fed so as to be in a quantity larger at the border of said lenticular lens sheet than at the center thereof.

* * * * *